(12) United States Patent
Venkatesulu et al.

(10) Patent No.: US 7,126,920 B2
(45) Date of Patent: Oct. 24, 2006

(54) PERFORMANCE OF LIFETEST USING CMTS AS A PROXY

(75) Inventors: Prema Venkatesulu, Feasterville, PA (US); Louis Bifano, Morrisville, PA (US); Rick Dziekan, N. Wales, PA (US)

(73) Assignee: General Instrument Corporation, Horsham, PA (US)

( * ) Notice: Subject to any disclaimer, the term of this patent is extended or adjusted under 35 U.S.C. 154(b) by 914 days.

(21) Appl. No.: 09/924,860

(22) Filed: Aug. 8, 2001

(65) Prior Publication Data

US 2003/0167319 A1    Sep. 4, 2003

(51) Int. Cl.
*H04L 12/26* (2006.01)

(52) U.S. Cl. ........................ 370/241; 370/252

(58) Field of Classification Search ................ 370/241, 370/249, 250, 251, 449, 453; 709/223–224; 725/14, 16; 379/1.01, 15.01, 22.01, 32.01
See application file for complete search history.

(56) References Cited

U.S. PATENT DOCUMENTS

| | | | | |
|---|---|---|---|---|
| 5,862,452 | A | 1/1999 | Cudak et al. ................ 455/6.3 |
| 6,031,841 | A | 2/2000 | Woundy .................... 370/410 |
| 6,058,106 | A | 5/2000 | Cudak et al. ................ 370/313 |
| 6,065,061 | A | 5/2000 | Blahut et al. ............... 709/239 |
| 6,088,337 | A | 7/2000 | Eastman et al. ............ 370/280 |
| 6,137,793 | A | 10/2000 | Gorman et al. ............. 370/360 |
| 6,233,235 | B1 | 5/2001 | Burke et al. ................ 370/356 |
| 6,272,150 | B1 | 8/2001 | Hrastar et al. .............. 370/486 |
| 6,282,208 | B1 | 8/2001 | Bowcutt et al. ............ 370/486 |
| 6,434,141 | B1 | 8/2002 | Oz et al. ..................... 370/352 |
| 6,512,824 | B1* | 1/2003 | Hsieh et al. ................. 379/230 |
| 6,697,970 | B1* | 2/2004 | Chisholm .................... 714/48 |
| 2001/0039582 | A1* | 11/2001 | McKinnon et al. ......... 709/226 |
| 2001/0055305 | A1 | 12/2001 | Oz et al. ..................... 370/389 |
| 2002/0049861 | A1 | 4/2002 | Bunn et al. ................. 709/247 |
| 2002/0059638 | A1 | 5/2002 | Oz et al. ..................... 725/129 |
| 2002/0062394 | A1 | 5/2002 | Bunn et al. ................. 709/246 |
| 2002/0073227 | A1 | 6/2002 | Bunn et al. ................. 709/236 |
| 2002/0080868 | A1 | 6/2002 | Bunn et al. ................. 375/222 |
| 2002/0112067 | A1* | 8/2002 | Chang et al. ............... 709/232 |
| 2002/0152292 | A1* | 10/2002 | Motoyama et al. ......... 709/223 |
| 2002/0169862 | A1* | 11/2002 | Bialk et al. ................. 709/223 |

(Continued)

OTHER PUBLICATIONS

Radio Frequency (RF) Interface Management Information Base for MCNS/DOCSIS Compliant RF Interfaces, by M. St. Johns, @Home Network, Aug. 1999.*

*Primary Examiner*—Chau Nguyen
*Assistant Examiner*—Rhonda Murphy
(74) *Attorney, Agent, or Firm*—Lawrence T. Cullen

(57) ABSTRACT

A system and method for performing Lifetest over a cable network system is provided which minimizes bandwidth usage by the Lifetest procedure while increasing the number of devices that the EMS may support. In accordance with the system and method, the EMS obtains device state information from the CMTS. Since the CMTS is constantly ranging its device population for state information, and since this information is stored in the DOCSIS Radio Frequency MIB, the EMS may obtain device state information by going to the MIB instead of directly to the device. This approach utilizes the distributed process inherently built into the system by taking advantage of the ranging that is already being performed by the CMTS. Since the EMS does not have to interact with every device in the system while performing Lifetest, consumption of bandwidth and processing resources is minimized.

25 Claims, 8 Drawing Sheets

U.S. PATENT DOCUMENTS

2003/0009543 A1* 1/2003 Gupta ................... 709/223
2003/0009553 A1* 1/2003 Benfield et al. ........... 709/224
2004/0210632 A1* 10/2004 Carlson et al. ........... 709/203

* cited by examiner

PERFORMANCE OF LIFETEST USING CMTS AS A PROXY

FIELD OF THE INVENTION

The present invention relates generally to methods for monitoring the status of network elements, and more particularly to methods for performing Lifetest on network elements in a cable network system.

BACKGROUND OF THE INVENTION

In recent years, the use of cable networks for Internet access has increased dramatically. This is due, in part, to the higher access speeds possible with cable modems as compared to traditional analog modems. In particular, a typical cable modem can operate at speeds about 500 times faster than those afforded by a conventional digital analog modem.

Cable networks are, by their nature, complex assemblies with a large number of components. These components include a multitude of Network Elements (NEs) such as Broadband Telephony Interfaces (BTIs), multimedia terminal adaptors and cable modems. In order to keep the network running properly, it is important for the cable provider to be aware of the state of all of the NEs.

One tool for monitoring the state of NEs on a network is a feature of the DOCSIS device manager called Lifetest, which is reponsible for obtaining the state of every NE in the system. This feature is implemented by the Element Management System (EMS), which is the operations system designed to manage a Cable Modem Termination System (CMTS) and the cable modems associated with it. The cable operator can schedule Lifetest to run on a periodic basis. The results of Lifetest will be displayed to the user, providing him with the state of all of the network elements on the network.

The current version of Lifetest requires the EMS to communicate directly with each NE in the system via a protocol called the Signaling Network Management Protocol (SNMP). During the procedure, the EMS polls each device in the system via an SNMP GET command in order to obtain its status. Since the Lifetest procedure, as it is currently implemented, involves communication with each NE in the system, it consumes substantial bandwidth and processing resources, especially in large networks, which in turn limits the number of NEs that a single EMS may support.

There is thus a need in the art for a system and method for implementing Lifetest, or a similar procedure for monitoring or tracking the status of network elements, over a cable network system in a way that minimizes consumption of bandwidth and processing resources, while increasing the number of devices that the EMS may support. These and other objectives are achieved by the present invention, as hereinafter described.

SUMMARY OF THE INVENTION

In one aspect, the present invention relates to a cable network comprising (i) a data switching system, such as a Cable Modem Termination System (CMTS), which is in communication with a plurality of network elements such as cable modems, broadband telephony interfaces, and multimedia terminal adaptors, and (ii) a management system, such as an Element Management System (EMS), for managing network elements on a cable network. The data switching system is adapted to query the network elements from time to time (preferably every t minutes, where t is within the range of about 10 to about 30) for status information, and is further adapted to store this status information in a database. The management system is adapted to obtain network element status information from the database, such as, for example, for the purposes of conducting Lifetest. Preferably, the management system is also adapted to manage the data switching system.

In another aspect, the present invention relates to a method for obtaining status information on network elements in a cable network, comprising the steps of (a) providing a cable network comprising a data switching system, such as a cable modem termination system, which is in communication with a plurality of network elements, (b) providing a management system, such as an Element Management System, for managing the network elements on the cable network, the management system being in communication with the database, (c) querying the network elements for status information by way of said data switching system and storing this status information in a database, and (d) accessing the status information from the database by way of said management system as, for example, for the purposes of conducting Lifetest.

In another aspect, a system and method are provided for performing Lifetest, or a similar procedure for monitoring or tracking the status of network elements, over a cable network system equipped with an Element Management System (EMS). The method minimizes consumption of bandwidth and processing resources while increasing the number of devices that the EMS may support. In accordance with the method, the EMS obtains device state information from the CMTS, rather than querying the network elements themselves. Since the CMTS is constantly ranging its device population for state information, and since this information is stored in the DOCSIS Radio Frequency MIB, the EMS may obtain device state information by going to the MIB instead of directly to the device. This approach utilizes the distributed process inherently built into the system by taking advantage of the ranging that is already being performed by the CMTS. Since the EMS does not have to interact with every device in the system while performing Lifetest or a similar procedure, consumption of bandwidth and processing resources is minimized.

In still another aspect, the present invention relates to a software program or suite disposed in a tangible medium, said software being adapted to implement one or more of the methods in the above described aspects of the invention.

DETAILED DESCRIPTION OF THE INVENTION

The present invention provides a system and method for performing a procedure for monitoring or tracking the status of network elements over a cable network system. The system and method are designed to minimize consumption of bandwidth and processing resources, while increasing the number of network elements that an EMS may support. The invention is illustrated herein with respect to the Lifetest procedure and with respect to particular cable network configurations. However, one skilled in the art will appreciate that the present invention can be readily adapted to monitoring procedures other than Lifetest and to other network configurations.

Figure 1:
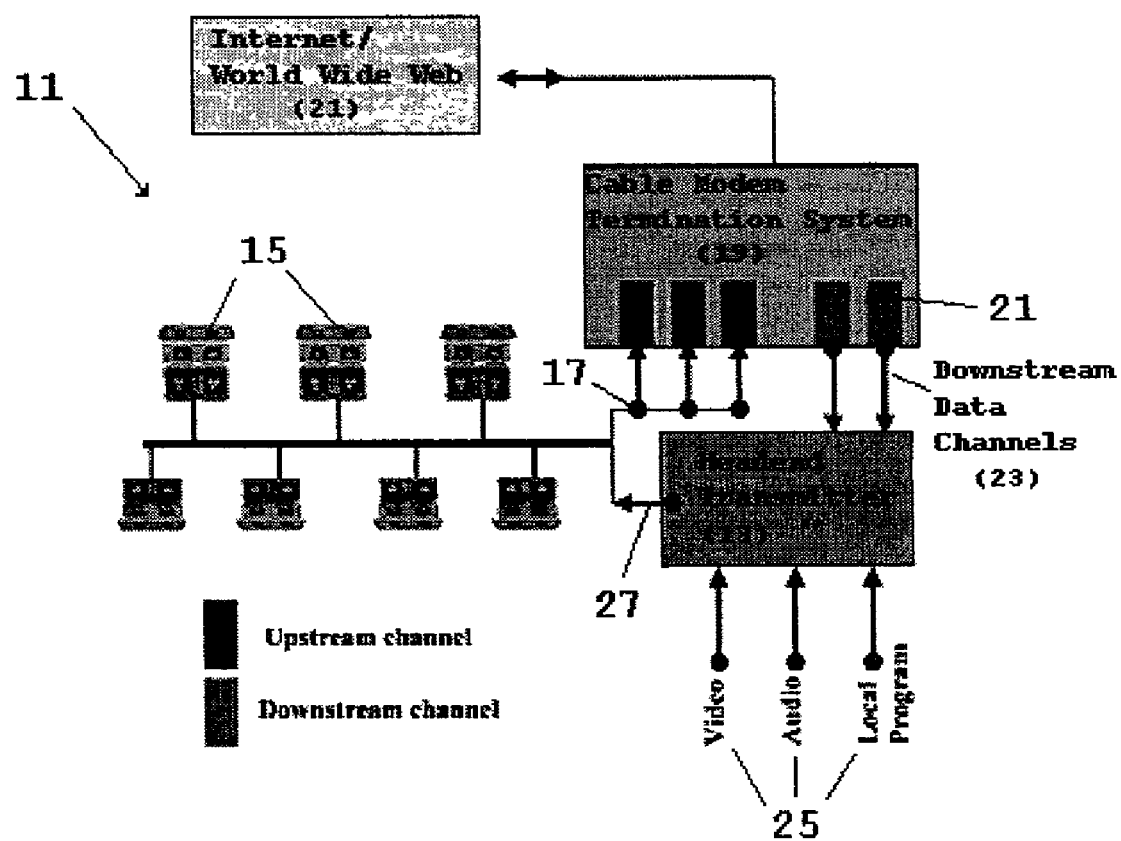
FIG. 1 is a schematic diagram depicting a typical cable network comprising a cable modem termination system and a cable headend transmission.

FIG. 1 depicts a typical cable network configuration 11. In this configuration, a cable headend 13 is provided at which data from individual users 15 is filtered by upstream demodulators 17 (or by a telephone return system in the case of a telephony return interface system) for further processing by a Cable Modem Termination System (CMTS) 19. A CMTS is a data switching system which is designed to route data from several cable modem users over a multiplexed network interface. Likewise, the CMTS is designed to receive data from the Internet 21 and to provide the data switching necessary to route data to the cable modem users. Hence, the CMTS serves to integrate upstream and downstream communication over the cable network.

Data from the network to a user group is typically sent to a modulator 22 that modulates the user data into one 6-MHz channel, which is the spectrum allocated for a cable television channel for broadcast to all users. The cable headend combines the downstream data channels 23 with the programs 25 received by television subscribers. The combined signal 27 is then transmitted throughout the cable distribution network. At the user location, the television signal is received by a set-top box (not shown), while user data is separately received by a cable modem box (not shown) and sent to a PC.

A CMTS typically provides an extended Ethernet network over a Wide-Area Network (WAN) with a geographic reach up to 100 miles. The cable data network may be managed by a local cable operations unit, or the operations may be combined at a regional data center. A given geographic or metropolitan region may have a few cable television headend locations that are connected together by fiber links. The day-to-day operations and management of a cable data network may then be consolidated at a single location, called a super hub, while other headend locations may be economically managed as basic distribution hubs.

A basic distribution hub comprises a minimal data network configuration within a cable television headend. A typical headend is equipped with satellite receivers, fiber connections to other regional headend locations, and upstream RF receivers for pay-per-view and data services. The minimal data network configuration includes a CMTS capable of upstream and downstream data transport and an IP router to connect to the super hub location.

A super hub is a cable headend location that is typically equipped with additional temperature-controlled facilities to house a variety of computer servers which are necessary to run the cable data networks. The servers include file transfer, user authorization and accounting, log control (syslog), IP address assignment and administration (DHCP servers), DNS servers, and DOCSIS control servers (discussed in greater detail below). In addition, a super hub may include operations support and network management systems necessary for the television as well as data network operations.

User data from basic and super hub locations is received at a regional data center for further aggregation and distribution throughout the network. A super hub supports the Dynamic Host Configuration Protocol (DHCP), DNS (Domain Name Server), and log control servers necessary for cable data network administration. A regional data center provides connection to the Internet and the World Wide Web and contains the server farms necessary to support Internet services such as e-mail, Web hosting, news, chat, proxy, caching, and streaming media servers.

Figure 2:
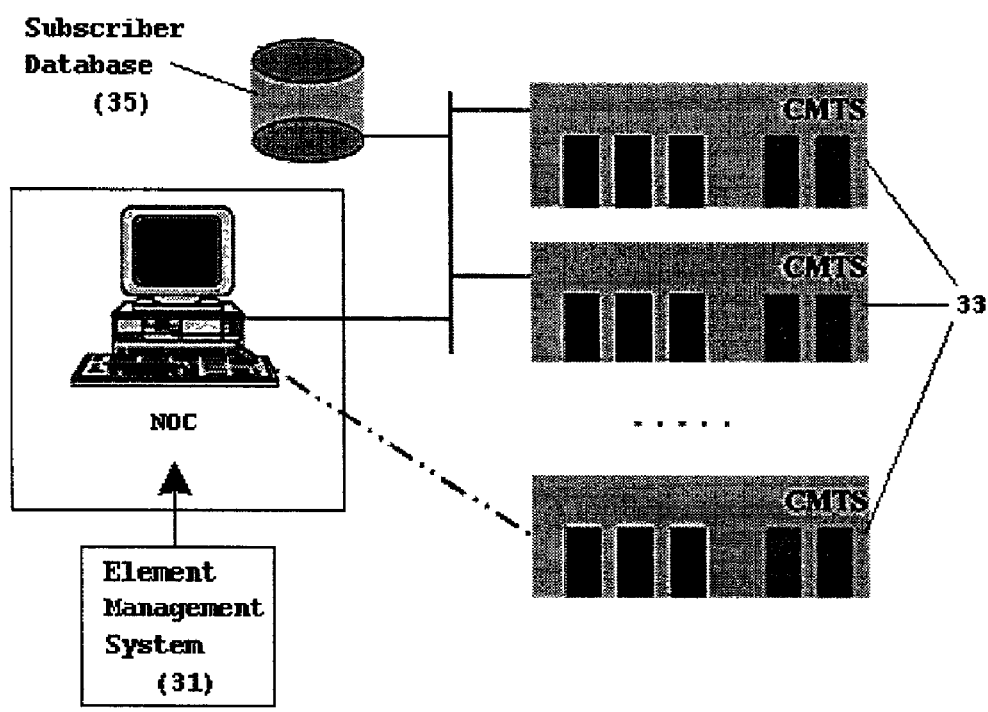
FIG. 2 is a schematic diagram depicting the functioning of an Element Management System in the operations and management of a cable network.

Referring to FIG. 2, another important element in the operations and day-to-day management of a cable network is an Element Management System (EMS) 31, the operations system designed to configure and manage a CMTS 33 and the cable modems associated with it. The EMS handles day-to-day administration of the network, performs testing and monitoring of various CMTS components, and provides alarms for various system events. As shown in FIG. 2, the EMS may be configured to operate from a central network operations center (NOC), through which it can singly support a plurality of CMTS systems over a geographic region. Each CMTS periodically ranges network devices, such as user cable modems, for status information, and stores this information in a subscriber database 35.

Due to its enormous complexity and large number of components, a cable data system is comprised of many different technologies and standards that are provided by various vendors. In order to develop a mass market for cable modems, the products from these various vendors must be interoperable. In order to accomplish this task, the North American cable television operators have formed a limited partnership, called the Multimedia Cable Network System (MCNS), and have developed an initial set of cable modem requirements referred to as Data Over Cable Service Interface Specifications (DOCSIS). The Operations Support System Interface (OSSI) requirements of DOCSIS specify how a cable data network is to be managed. To date, the requirements specify an RF Management Information Base (MIB). This enables system vendors to develop an EMS to support spectrum management, subscriber management, billing, and other operations.

A cable modem incorporates many features, aside from modulation and demodulation, that enable broadband communications over Wide-Area Networks (WANs). These features are effected by the cable modem operating system, which is typically segregated into a network layer and a data link layer.

The network layer supports the Internet and World Wide Web services, and includes the Internet Protocol (IP) suite which is supported by the cable networks. The IP suite includes application-layer communications protocols such as the Simple Network Management Protocol (SNMP), which reports anomalous network conditions and sets network threshold values, the File Transfer Protocol (FTP), which moves files between devices, the Transmission Control Protocol (TCP), and the User Datagram Protocol (UDP). All of the Internet-related applications are supported in the IP suite, including e-mail, ftp, tftp, http, news, chat, and the SNMP.

The use of SNMP, which is a well-established protocol framework that has been in published form since 1990, provides for management of the CMTS and cable data networks. It has been widely adopted in the datacom industry such that, at present, close to 100% of shipping network equipment is manageable via SNMP. Furthermore, the rapid adoption of SNMP in the telecom industry ensures that it will remain as a de facto management standard in all packet-based networks for the foreseeable future.

Referring again to the cable modem operating system, the data link layer of this system comprises three sublayers: (1) a logical link control sublayer, (2) a link security sublayer conforming to the security requirements, and (3) a media access control (MAC) sublayer suitable for cable system operations. The MAC layer of the cable modem operating system provides the general functionalities necessary for a plurality of cable modem subscribers to share a single upstream data channel for transmission to the network. These functionalities include collision detection and retransmission. The large geographic reach of a cable data network poses special problems as a result of the transmission delay between users in close proximity to the cable headend versus users more removed from the cable headend. To compensate for cable losses and delay as a result of distance, the MAC layer performs ranging, by which each cable modem can assess time delay in transmitting to the headend. The MAC layer supports timing and synchronization, bandwidth allocation to cable modems at the control of CMTS, error detection, handling and error recovery, and procedures for registering new cable modems.

Figure 3:
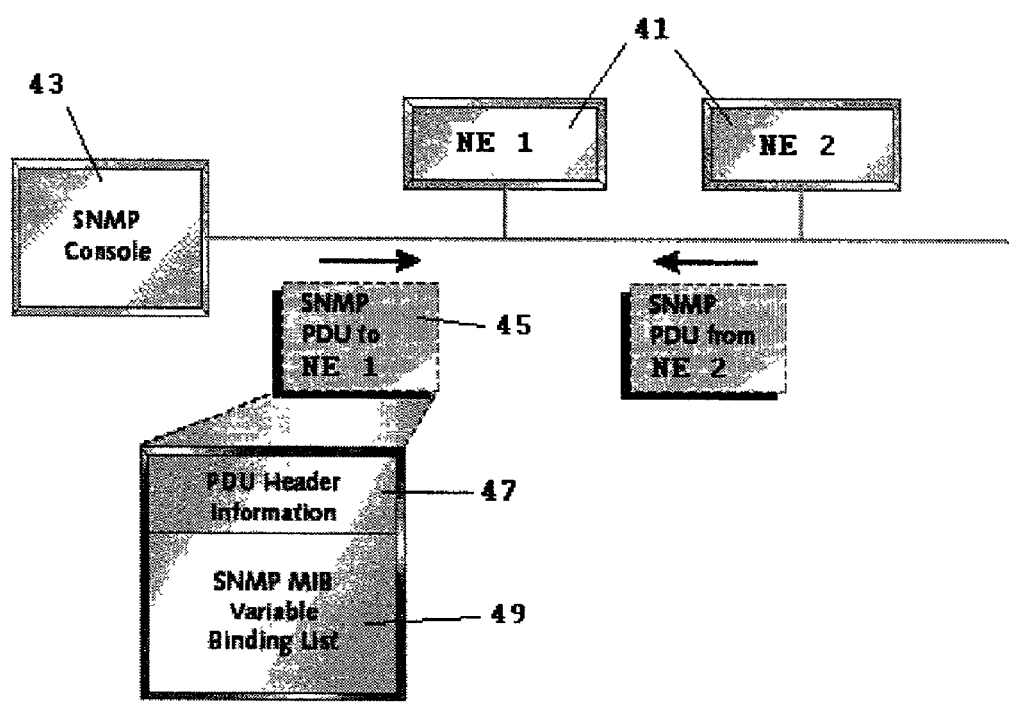
FIG. 3 is a schematic diagram depicting the functionality of an SNMP GET.

As shown in FIG. 3, SNMP enables a system administrator to simultaneously manage a vast number of heterogeneous Network Elements (NEs) 41, such as Multimedia Terminal Adaptors (MTAs), Cable Modems (CMs), and Broadband Telephony Interfaces (BTIs), through an external SNMP console 43. Suitable consoles include, for example, Hewlett Packard's OpenView™ console. This management is accomplished through the manipulation of Management Information Base (MIB) objects, which consist of a series of variables that reside on each NE that describe the state of the NE. The administrator can direct the SNMP console to monitor and alter the MIB objects on any device, thereby controlling its behavior. The console performs this manipulation of a device's MIB objects by sending out an SNMP GET PDU (Protocol Data Units) command and an SNMP SET PDU command. Each SNMP PDU 45 contains PDU header information 47 that helps IP on other machines determine what to do with the packet. Each SNMP PDU also has encoded within it an SNMP variable binding list 49, which contains the relevant and appropriate MIB variables and values. The SNMP agent, which resides on the NE itself, receives the PDUs, parses out the list of variables, and consults its resident MIB with respect to the variables.

The parsing of MIB objects within the PDUs is achieved through the use of the Structure of Management Information (SMI), which is a published, freely available and universal set of rules for specifying an MIB object. In accordance with SMI rules, the MIB objects in the PDUs are encoded both by the console and by the agent. Since SMI is a recognized standard, it is already known by both the agent and the console before the management of any NE via the SNMP.

Figure 4:
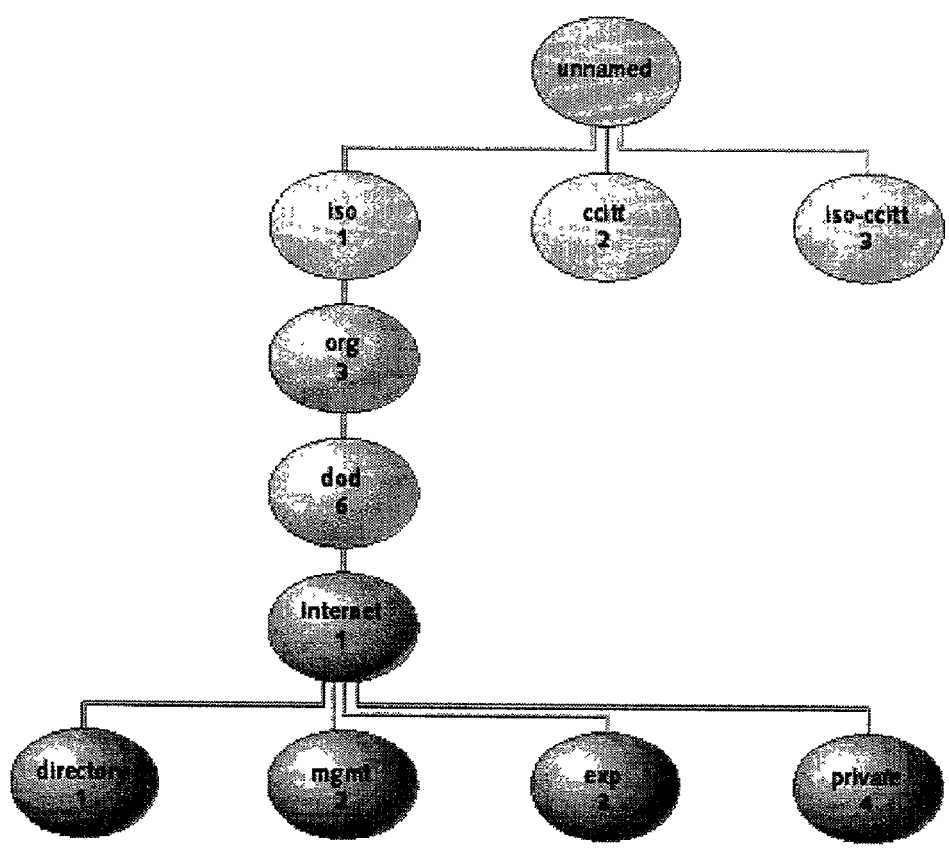
FIG. 4 is a schematic diagram depicting the hierarchy of SNMP MIB variables.

All MIB objects are configured according to the SMI hierarchy shown in FIG. 4. Hence, all MIB objects in the SNMP universe have the following prefix: iso.org.dod.internet or, in numerical form, is 1.3.6.1. To date, the other groups shown in FIG. 4 (ccitt and iso-ccitt) do not have any MIBs specified under them that have gained any widespread acceptance, nor have any other standard subgroups been defined under the iso, org, or dod groups.

The use of the SMI hierarchy facilitates the specification of SNMP MIB objects. For example, the variable sysObjectID is part of the system group which, in turn, is part of MIB II. MIB II, which is part of the management group shown in FIG. 4, is a standard set of MIB objects that is published in RFC form. This set of MIB objects is implemented on virtually every packet-based NE that has SNMP. Hence, both the console and the SNMP agent have prior knowledge of the variable sysObjectID.

Figure 5:
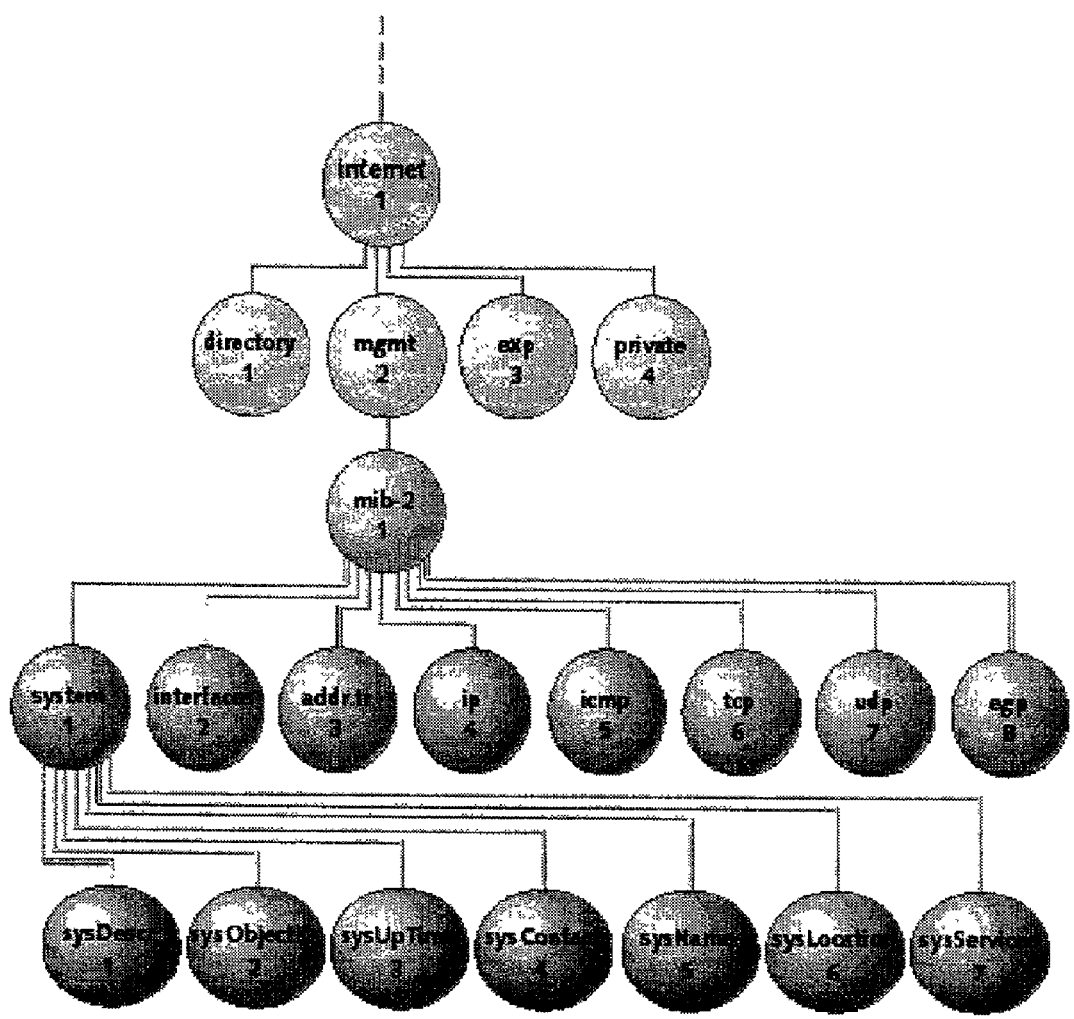
FIG. 5 is a schematic diagram further depicting the hierarchy of SNMP MIB variables.

To further illustrate the specification of sysObjectID, the Internet element of the SMI hierarchy of FIG. 4 has been expanded to a further level in FIG. 5. There, it is seen that the variable sysObjectID has the full specification of iso.org.dod.internet.mgmt.mib-2.system.sysObjectID. In numerical form, this reduces to 1.3.6.1.2.1.1.2. This specification, which is referred to as an Object IDentifier (OID), consists of a base OID, 1.3.6.1.2.1.2, that has a 0 appended onto it for a total specification of 1.3.6.1.2.1.1.2.0. The 0 signifies that the first and only instance of sysObjectID should be returned, since sysObjectID is a scalar SNMP variable. Thus, when an SNMP console wants to "get" or "set" the value for sysObjectID, it sends out an SNMP GET or SET PDU with the OID 1.3.6.1.2.1.1.2.0 encoded within it. The NE, in turn, will parse through the OID and consult its MIB. The MIB is a set of mappings between MIB variable OIDs and the appropriate GET and SET routines that provide read and write access, respectively, to the data. Depending on the nature of the request, the SNMP agent then calls either the GET or SET routine that is associated with the relevant variable, passes the instance variable 0 to the routine, and from there is able to monitor or update the state of its host's system object ID.

Figure 6:
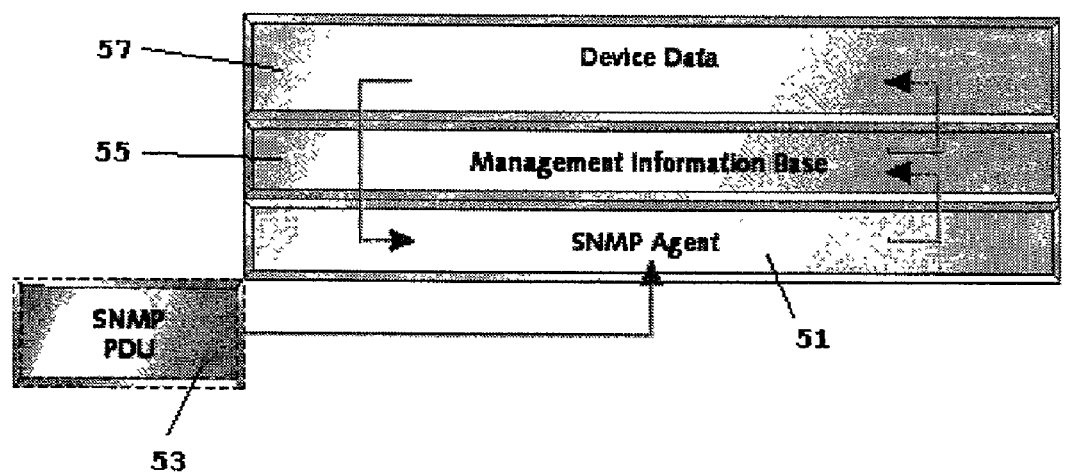
FIG. 6 is a schematic diagram depicting the software organization of a Network Element manageable by SNMP.

As illustrated in FIG. 6, in order for an NE to be manageable by SNMP, it must be provided with an SNMP agent 51 that is capable of receiving, parsing, building, and sending SNMP PDUs 53, and it must have an MIB 55. The MIB, in turn, must have a significant number of MIB objects, with their corresponding GET and SET routines, in order for the console to be able to effectively monitor and control the NE and its corresponding device data 57. Commercial quality SNMP agents are provided by a number of vendors. One such vendor is SNMP Research and Integrated Systems (ISI)/Epilogue, which is now part of Wind River Systems. A number of free SNMP agents have also been developed.

However, portions of SNMP, such as the design, definition, and description of a device's MIB objects, must currently be developed uniquely for each device. This is due, in part, to the fact that the MIB objects need to access real data, which means there must be GET and SET routines written that access real variables used in the firmware. Since there is an almost unlimited number of ways of representing this data, these GET and SET routines for each MIB variable are relatively unique to each device code line.

In its current implementation, Lifetest requires the EMS to perform SNMP GET routines (often referred to simply as "SNMP gets") on the entire population of network devices in order to determine the status of all devices in the system. The implementation is as follows:

The BTI MIB is polled for the Battery Status. Line power is checked first to see if the device is operating in AC or DC mode.

The status information is stored in cache and displayed in the device listing view as well as in the device viewer.

There are 3 status lights in the device listing display (upstream/downstream/status) for NEs. Downstream is assumed if communication is made, status comes from the battery status and upstream is not implemented.

The status of the CMTS is determined by checking the IF table to determine the status of the upstream, downstream and MAC Layer interfaces.

The status of the Line Cards is always assumed to be good and is displayed with green indicator lights.

Lifetest runs every 20 minutes and requires the system to communicate via SNMP with every NE in the system.

The results of Lifetest appear only in the device listing screen, which uses a Microsoft Explorers® type view to display the CMTS, its Line cards and all of its associated devices. Topology obtained during Discovery is used to determine the association between the NE, CMTS and Line card.

Figure 7:
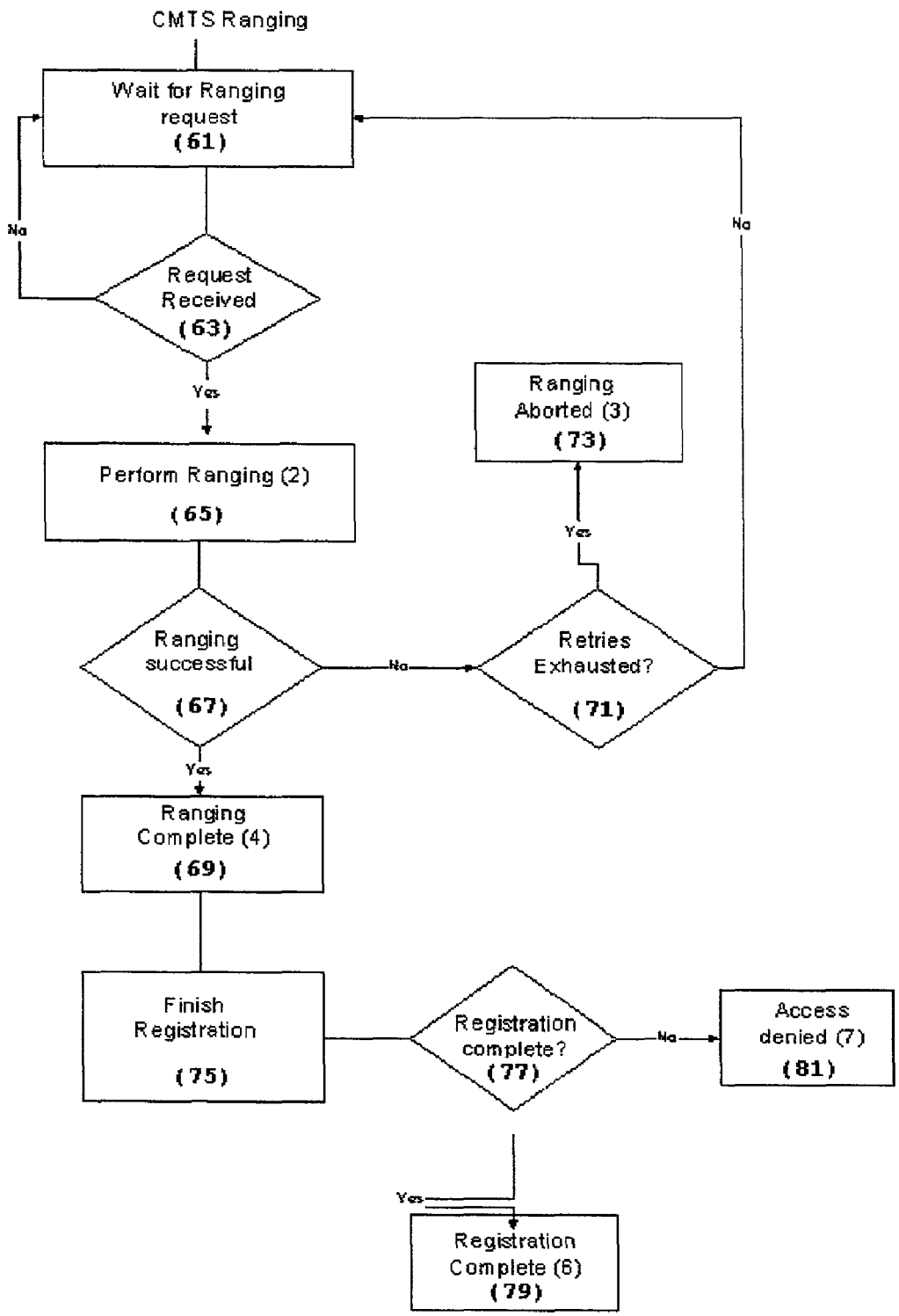
FIG. 7 is a flowchart illustrating the procedure by which a CMTS ranges its device population for status information.

In contrast to the above described version of Lifetest, the version of Lifetest conducted in accordance with the present invention takes advantage of the fact that, in the course of performing its normal functions, each CMTS is constantly ranging its NE population for state information using the above described protocols. This ranging procedure is depicted schematically in FIG. 7, where the numerical values indicated in each box of the flowchart are the values of the docIfCmtsCmStatus value OID returned for that status of the device.

As depicted in the flowchart, each NE on the network has a ranging functionality that remains in stand-by mode while the device is awaiting a ranging request 61 from the CMTS. The standby mode is essentially in the form of an If-Then-Else loop defined by a Request Received 63 boolean parameter, such that the system continues to loop as long as the condition of "ranging request received" is false. When this condition is found to be true, the device proceeds to perform the ranging function 65, giving the device a status value OID of 2. If ranging is successful 67, ranging is completed 69, giving the device a status value OID of 4. If ranging is unsuccessful, the course of action depends on whether the allowed number of retries has been exceeded 71. If so, ranging is aborted 73, thus giving the device a status value OID of 3. If not, the ranging functionality is returned to standby mode until either ranging is completed or the specified number of retries has been exceeded.

When ranging is completed, the device proceeds to finish device registration 75. If the value of the boolean parameter "Registration Complete" 77 is found to be true after device registration is finished, then the registration process is completed 79 and the status value OID is set to 6. If the value of the boolean parameter "Registration Complete" is found to be false after device registration is finished, the status value OID is set to 7, which corresponds to the state "access denied" 81.

Through its normal operation, the EMS will be aware of each CMTS in the system from previous discovery operations. Also, as noted above, each CMTS is constantly ranging its NE population for state information using the above described protocols. This status information is stored in the DOCSIS Radio Frequency MIB. The present invention takes advantage of this fact in monitoring or tracking the status of NEs, as is required, for example, to perform the Lifetest procedure. Thus, in accordance with the methodology of the present invention, when the EMS is required to run Lifetest or similar procedures requiring knowledge of NE state information, it obtains the NE state information from the CMTS DOCSIS radio frequency MIB instead of querying each NE directly. This approach utilizes the distributed process already built into the system by taking advantage of the ranging that is already being performed by the CMTS. Since the EMS does not have to interact with every device in the system while performing such a procedure, consumption of bandwidth and processing resources is minimized.

Figure 8:
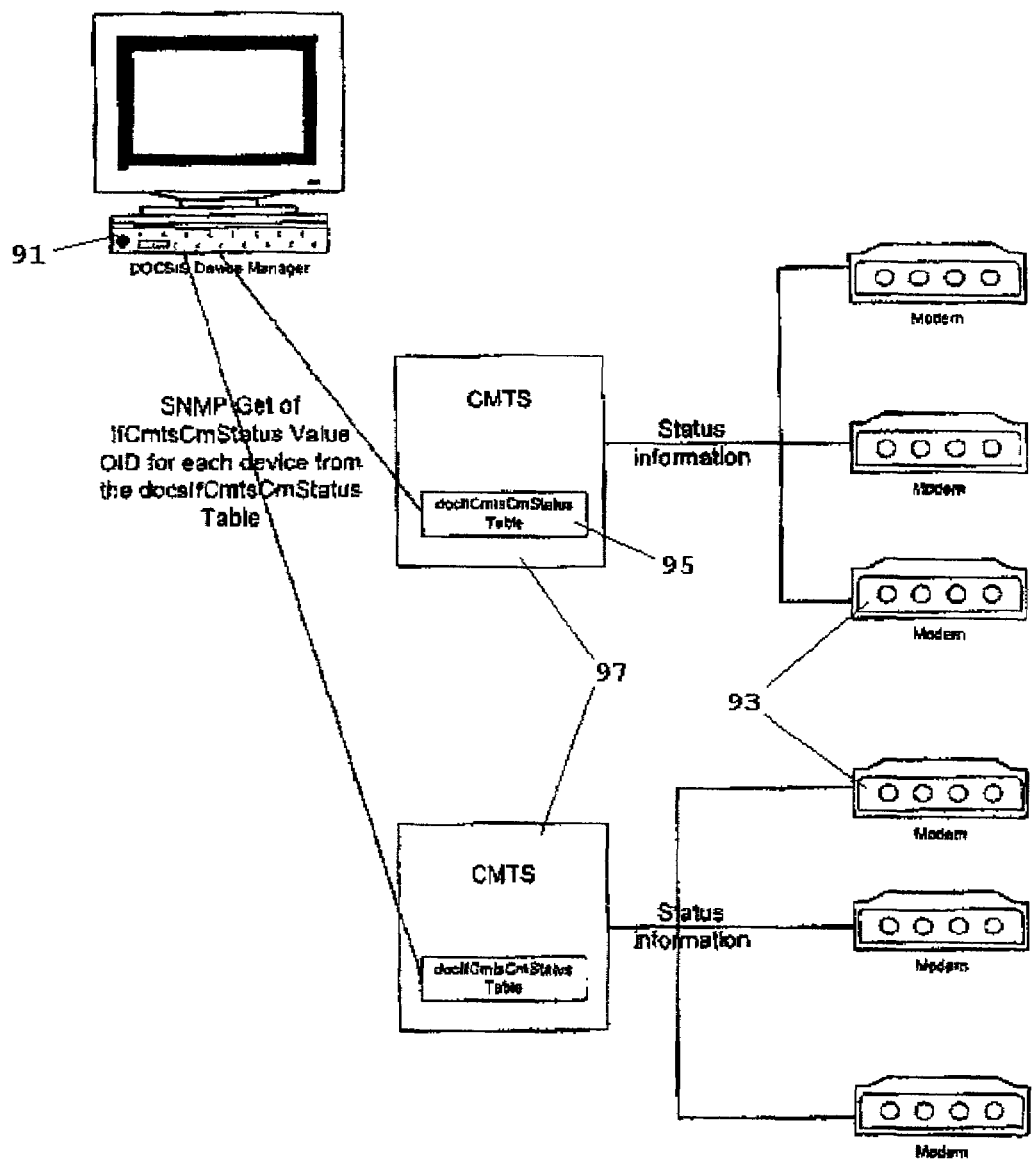
FIG. 8 is a schematic diagram depicting a system on which the Lifetest procedure may be implemented in accordance with the present invention.

FIG. 8 depicts a system on which Lifetest may be implemented in accordance with the methodology of the present invention. The EMS resident on the DOCSIS device manager 91 (which is typically a PC in communication with each CMTS on the system) obtains the state information of the NEs 93 (in this case, a series of cable modems) from the CMTS DOCSIS radio frequency MIB on a periodic basis which may be set by the system administrator. In order to obtain the NE state information, the EMS will poll the docsIfCmtsCmStatus Table 95 (and specifically the docsIfCmtsCmStatusValue OID) for the state of each network element using an appropriate SNMP Get. There is a table entry for each NE which is connected to a CMTS 97. The docsIfCmtsCmStatus Table also contains the MAC address (docsIfCmtsCmStatusMacAddress OID) of each NE which can be used to link the device state to the corresponding device in the device list. TABLE I illustrates how the device state can be determined from the docsIfCmtsCmStatus Value OID, the later of which was previously described in reference to FIG. 7.

TABLE I

| DocsIfCmtsCmStatus Value | Lifetest State | State Light |
| --- | --- | --- |
| Other (1) - probably vendor specific | Unknown | Gray |
| Ranging (2) | Transitional | Yellow |
| Ranging aborted (3) | Red | Red |
| Ranging complete (4) | Transitional | Yellow |
| IP complete (5) | Transitional | Yellow |
| Registration complete (6) | Up | Green |
| Access Denied (7) | Down | Red |

In the course of a procedure such as Lifetest, the EMS will need to examine the value of this OID for each network element supported by the CMTS. When the EMS has polled each CMTS in the system, the Lifetest procedure may be considered complete. Since interaction with each NE is avoided in conducting the procedure in accordance with the methodology of the present invention, bandwidth consumption by the procedure is reduced significantly. This, in turn, increases the number of devices that may be controlled by the EMS.

Various other features may be included methodology of the present invention. Thus, for example, the system may be configured to maintain various statistics relating to the Lifetest procedure, such as the number of NEs per CMTS that were involved in the test and the percentage of devices that are up, down, transitional, or unavailable, and these statistics may be depicted graphically on a console. Progress indicators may also be provided that gauge the progress of the procedure. Traps may be provided for devices that do not respond with status information, and these traps may be forwarded to a higher level manager for further action. Also, scheduling mechanisms may be incorporated into the system for Lifetest such that the Lifetest procedure will be run periodically or at other such intervals as may be determined, for example, by the system administrator; however, it is preferred that the Lifetest procedure be run every t minutes, wherein t is within the range of about 10 to about 30.

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A cable network, comprising:
a data switching system in communication with a plurality of network elements, said data switching system being adapted to issue ranging requests to said network elements from time to time, determine transmission time delays associated with each of said network elements based on responses to the ranging requests, and to store responses to the ranging requests in a database; and
a management system for managing network elements on the cable network, said management system being adapted to obtain network element status information from said database,
wherein status information indicating a status of said network elements is determined based on the responses by a network element to the ranging request.

2. The cable network of claim 1, wherein said management system is further adapted to manage said data switching system.

3. The network of claim 1, wherein said plurality of network elements are selected from the group consisting of cable modems, broadband telephony interfaces, and multimedia terminal adaptors.

4. The network of claim 1, wherein said plurality of network elements comprises a plurality of cable modems.

5. The network of claim 1, wherein said data switching system is adapted to route data from a plurality of cable modem users over a multiplexed network interface.

6. The network of claim 1, wherein said data switching system is a cable modem termination system.

7. The network of claim 6, wherein said management system is an element management system.

8. The network of claim 7, wherein said element management system is adapted to perform a Lifetest procedure by obtaining network element status information from said database.

9. The network of claim 1, wherein said management system is an operations system which is further adapted to configure and manage said data switching system.

10. The network of claim 1, further comprising a plurality of data switching systems, each of which is in communication with a plurality of endpoint devices and is adapted to query the endpoint devices from time to time for status information and to store the status information in a database.

11. The network of claim 10, wherein said management system is adapted to configure and manage said plurality of data switching systems.

12. The network of claim 1, wherein said data switching system is adapted to query said network elements every t minutes, and wherein t is within the range of about 10 to about 30.

13. The network of claim 1, wherein the database is a DOCSIS radio frequency MIB.

14. The network of claim 1, wherein the data switching system assigns each network element a status selected from the group consisting of up, down or transitional.

15. A cable network, comprising:
a cable modem termination system in communication with a plurality of network elements selected from the group consisting of cable modems, broadband telephony interfaces, and multimedia terminal adaptors, said cable modem termination system being adapted to issue ranging requests to said network elements from time to time and determine transmission time delays associated with each of said network elements based on responses to the ranging requests, and to store responses to the ranging requests in at least one file; and
an element management system in communication with said cable modem termination system, said element management system being adapted to obtain status information about said network elements from said at least one file,
wherein status information indicating a status of said network elements is determined based on the responses by a network element to the ranging request.

16. The cable network of claim 15, wherein said at least one file is a database, and wherein said element management system is adapted to run a Lifetest procedure by obtaining network element status information from said database.

17. A method for obtaining status information on network elements in a cable network, comprising the steps of:
providing a cable network comprising a data switching system in communication with a plurality of network elements;
providing a management system for managing the network elements on the cable network, the management system being in comniunication with the database;
providing a ranging request signal from the data switching system to each of the network elements of the plurality of network elements, and determining transmission time delays associated with each of said network elements based on responses to the ranging requests;
determining status information for each of the plurality of network elements based on a response from each of the plurality of network elements to the ranging request signal, respectively;
storing this status information in a database; and
accessing the status information from the database by way of said management system.

18. The method of claim 17, wherein said plurality of network elements are selected from the group consisting of cable modems, broadband telephony interfaces, and multimedia terminal adaptors.

19. The method of claim 17, wherein said plurality of network elements comprises a plurality of cable modems.

20. The method of claim 17, wherein said data switching system is adapted to route data from a plurality of cable modem users over a multiplexed network interface.

21. The method of claim 17, wherein said data switching system is a cable modem termination system.

22. The method of claim 21, wherein said management system is an element management system.

23. The method of claim 22, wherein said element management system is adapted to perform a Lifetest procedure by obtaining network element status information from said database.

24. The method of claim 17, wherein the database is a DOCSIS radio frequency MIB.

25. The method of claim 17, wherein the management system is further adapted to manage the data switching system.

* * * * *